April 18, 1933. H. F. KURTZ 1,904,867
METHOD OF RÖNTGENOLOGICAL REPRODUCTION
Filed Sept. 26, 1927 2 Sheets-Sheet 1

HENRY F. KURTZ,
INVENTOR

April 18, 1933.  H. F. KURTZ  1,904,867
METHOD OF RÖNTGENOLOGICAL REPRODUCTION
Filed Sept. 26, 1927   2 Sheets-Sheet 2

INVENTOR
HENRY F. KURTZ.
BY
Cumpston & Griffith
his ATTORNEYS

Patented Apr. 18, 1933

1,904,867

UNITED STATES PATENT OFFICE

HENRY F. KURTZ, OF ROCHESTER, NEW YORK, ASSIGNOR TO BAUSCH & LOMB OPTICAL COMPANY, OF ROCHESTER, NEW YORK, A CORPORATION OF NEW YORK

METHOD OF RÖNTGENOLOGICAL REPRODUCTION

Application filed September 26, 1927. Serial No. 222,161.

This invention relates to Röntgenology and more particularly it is concerned with methods and apparatus whereby Röntgenograms may be produced and viewed stereoscopically.

One of the most important objects of the present invention is to provide methods and means for Röntgenological reproduction in which X-ray stereograms are produced and viewed so that true, accurate and comfortable stereoscopic views are afforded.

Other objects are to produce X-ray stereograms which are to be viewed under certain conditions; to view X-ray stereograms which have been produced under certain conditions and to provide efficient means for effecting the production and viewing of X-ray stereograms according to my invention.

The usual practice in stereographic Röntgenological diagnosis involves the production of a pair of X-ray negatives or stereograms by successively exposing two sensitized elements to a source of X-rays, the source being shifted a certain distance, very generally 2½ inches, between the successive exposures. These negatives or stereograms are then placed in a stereoscopic viewing device and adjustments are made until some sort of semblance of fusion of the two images is obtained. Although this affords views having relief or stereoscopic effects, such views do not accurately portray the subject in three dimensions, with the resulting effect that serious errors are introduced when an attempt is made to determine the exact location of a foreign body or a pathological condition, for example. Since an operating surgeon is very often guided solely by the findings of an X-ray examination, it is evident that the value of true and accurate stereoscopic views cannot be overestimated.

The difficulties and inaccuracies of the prevailing methods of X-ray stereoscopy are eliminated by employing my improved methods and apparatus. As will hereinafter be more fully explained, accurate and comfortable stereoscopic vision is dependent upon the proper observance and correlation of certain principles of vision.

Referring to the drawings.

Figure 1:
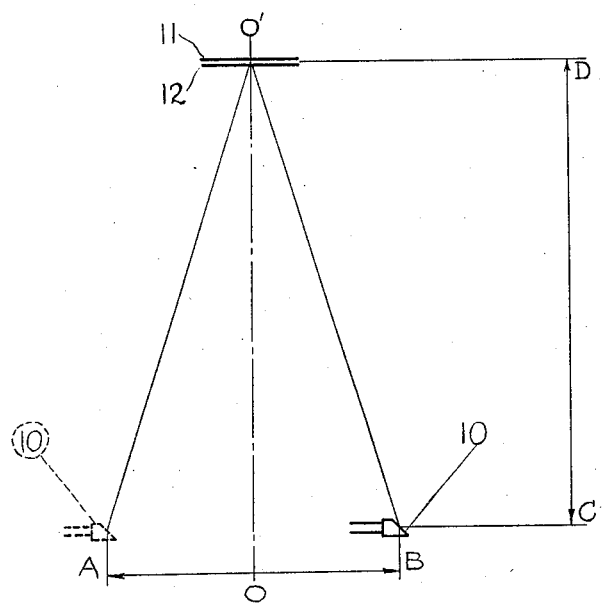
Fig. 1 is a diagrammatic view illustrating my method of exposure.

The general conditions necessary for accurate and comfortable stereoscopic vision are a harmony between accommodation and convergence and a precise, definite difference in perspective between the views presented to two eyes.

Accommodation is the power of varying the focus of the eye to bring divergent rays together on the retina and the amount of accommodation necessarily varies for objects located at different distances. Convergence is the ability to direct the visual lines of the two eyes to a near point. If one looks at a distant object accommodation is relaxed and the lines of sight are parallel, but for viewing a near object it is necessary to accommodate and also to converge for the particular distance. When convergence is effected for one distance and accommodation is effected for a different distance simultaneously, the resulting recomposition is inaccurate and very uncomfortable. This result is invariably produced when the usual methods of stereoscopic Röntgenography are employed. Accommodation and convergence are correspondingly associated and for a given distance there is one degree of accommodation and a corresponding single degree of convergence.

When an object is viewed at a definite distance with both eyes, the view presented to the left eye differs in perspective from that presented to the right eye. It is also true that views of the same object seen from different distances are different in perspective. In other words, the right and left views will differ from each other at any distance and a pair of views will vary with the distance.

The fulfillment of the conditions of harmony between accommodation and convergence and a difference in perspective between the views which is correct in aspect, but of any degree, is sufficient for the production of relief effects or plastique. However, in order that the degree of plastique shall not be excessive or insufficient, that is, that the third dimension shall be precise, the fulfillment of a third condition is necessary. This condition is dependent upon the fact that the degree of difference in perspective between the right and left views increases as the viewing distance decreases. The difference at a given distance is therefore specific to that distance. This, interpreted in terms of Röntgenological stereoscopy means that negatives or stereograms taken at a given distance must be viewed at the same distance, or under geometrically homologous conditions which can be secured by a properly designed viewing device.

In order to more clearly explain and describe my invention, X-ray stereograms of the human chest will be used by way of illustration. It is obvious, however, that my invention is not limited to X-ray stereograms of the human chest, as it may be applied with equal effect and advantage to the Röntgenological examinations of any object or objects.

In the usual practice of making X-ray stereograms of the human chest, the exposure distance, that is, the distance from the plane of the focal point or anode of the X-ray tube to the sensitized element, is usually anywhere from 20 to 60 inches. Stereograms exposed at this distance are then usually viewed in a device having a viewing distance which varies from 27 to 36 inches. Such practices violate the aforementioned principles of accurate stereoscopic vision and one viewing such stereograms of the chest experiences discomfort, besides receiving an impression generally that the chest lacks depth to a marked degree.

The first requisite in the development of my improved method is the establishment of a normal viewing distance. This may be defined as that distance between the eyes and an object that results in maximum plasticity consistent with comfort. The nearer, within reasonable limits, an object is to the eyes the more pronounced is the plasticity, that is, the impression of relief or third dimension becomes more pronounced as the distance diminishes. Experience shows that an object may be comfortably viewed at a distance of 15 inches, but that as the distance becomes less, vision becomes difficult because of the severe accommodative effort. The average person with active accommodation sees comfortably at 10 inches, but allowing for variation in individuals, it is reasonable to assume 15 inches as a normal viewing distance. Although I have used 15 inches as the normal viewing distance in this specification, it is for illustration only, and it is to be distinctly understood that I do not limit my invention to a normal viewing distance of 15 inches.

When a normal viewing distance has been established, the convergence angle is automatically established, since it must be the angle subtended by average interpupillary distance, namely, 2½ inches, at normal viewing distance. Since 15 inches has been selected as normal viewing distance for purposes of illustration in this specification, the convergence angle of my illustration will be the subtense of 2½ inches at a distance of 15 inches. The interpupillary distance of 2½ inches is an average and is by way of illustration only, as my invention is not limited to an interpupillary distance of 2½ inches.

In order to produce X-ray stereograms in accordance with my method, this would mean that the X-ray tube would be positioned only 15 inches from the sensitized element and that the tube would be shifted only 2½ inches between successive exposures. As it is obviously impossible to work at this distance, other expedients must be resorted to in order to obtain correct convergence conditions in accordance with my invention.

Upon experiment, it was found that a distance of 45 inches from the anode of the X-ray tube to the sensitized element is suitable. At this distance the entire chest of the larger subjects is projected upon a 14″ x 17″ film when exposed with the necessary tube shift. In order to meet the convergence conditions required by my invention, it is necessary to shift the X-ray tube 7½ inches between successive exposures when working at an exposure distance of 45 inches. The triangle represented by the subtense of 7½ inches at 45 inches is mathematically proportional to the triangle represented by the subtense of 2½ inches at 15 inches. Although I have used 45 inches as an exposure distance, and 7½ inches as a tube shift, it is by way of illustration only, and it is to be understood that my invention can be equally well applied to other exposure distances and tube shifts.

Fig. 1 of the drawings illustrates my method of producing X-ray stereograms by successively exposing two sensitized elements to a source of X-rays, the X-ray tube being shifted between exposures. The anode of the X-ray tube, indicated at 10, is located at the full-line position for the exposure of the first negatives and is laterally shifted to the dotted line position for exposure of the second negative. The tube shift or separation between exposures of the two sensitized elements is indicated at AB, the tube shift for the illustration under consideration being equal to 7½ inches. The distance from the plane of the X-ray tube anode to the sensitized element, which is called the exposure distance, is indicated at CD and for the example chosen this distance is equal to 45 inches. The two positions of the X-ray source and the geometrical center of the sensitized element define a plane which is perpendicular to the sensitized element. An imaginary axial line OO' lies in this plane. The sensitized elements, which may be either plate or film, are indicated at 11 and 12. Although these elements 11 and 12 are shown slightly spaced on Fig. 1, they are actually successively placed in the same plane when exposures are made, as will be readily understood by one skilled in the art.

If these films, after development, were replaced in this system in precisely the same positions occupied during exposure, and if the right eye could be placed in the position occupied by the X-ray source for the exposure of the first film 11 and if the left eye could be placed at the position occupied by the source for the exposure of the second film 12, a precise comfortable view would be received providing the right eye could view only the negative 11 and the left eye only negative 12. This, however, is impossible because an interpupillary distance of 7½ inches does not exist and because such an arrangement would not permit selectivity for each individual eye.

Figure 2:
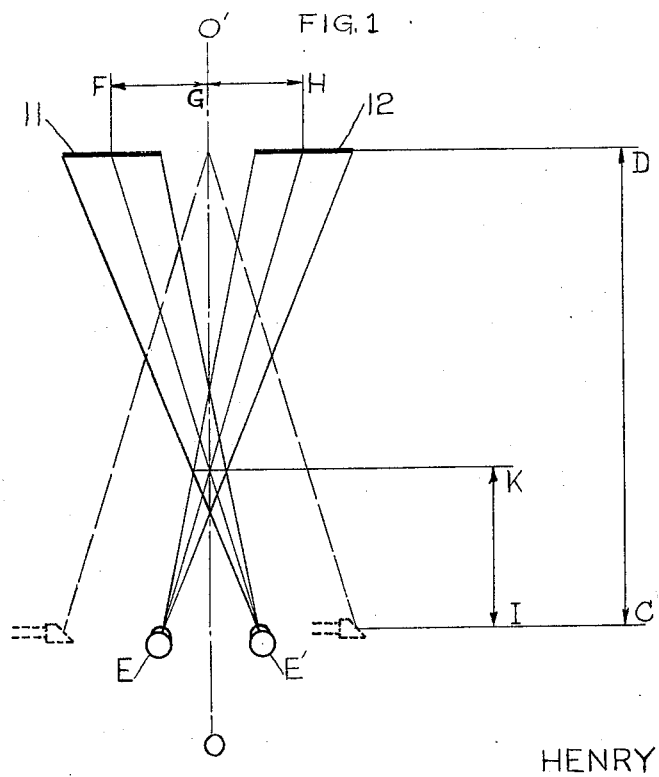
Fig. 2 is a diagrammatic view showing an incorrect viewing method in which convergence and accommodation are not harmonized.

Figure 2 illustrates a viewing arrangement which is designed to overcome these two difficulties. In this arrangement film 11, which was exposed when the X-ray source 10 was located in the full line position at the right in Fig. 1, is offset to the left of the axis line OO' a distance FG which in this illustration is equal to 2½ inches. The film 12, which was exposed when the source 10 was located at the dotted line position shown in Fig. 1, is offset to the right a distance GH which is equal to 2½ inches in the illustration under consideration.

This arrangement allows vision under the correct convergence with an interpupillary distance of 2½ inches between the eyes E, E'. It is to be understood that these offsetting movements involve translation only, with no rotation and it is to be further understood that the films 11 and 12 are very small so that the offsetting movements will completely separate the films. The amount of offset of the films in any case is obtained by subtracting the interpupillary distance from the X-ray tube shift and dividing the remainder by two. It will be observed that the visual axes of the two eyes E, E' intersect at a point whose distance from the eyes is denoted by IK. In the illustration under consideration this distance IK is equal to 15 inches, which was assumed as the normal viewing distance. Although this arrangement fulfills the convergence requirement, it does not provide precise, comfortable stereoscopy since accommodation and convergence do not harmonize, as the eyes are attempting to accommodate for 45 inches and at the same time to converge for 15 inches.

Figure 3:
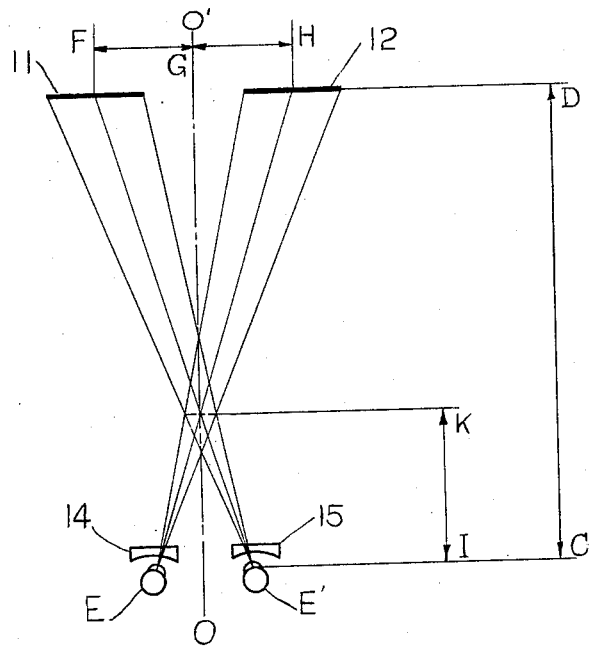
Fig. 3 is a diagrammatic view illustrating my improved method of viewing stereograms.

In order to provide for harmony of accommodation and convergence, I position a negative lens 14, 15 before each eye E, E' as clearly shown in Fig. 3. These lenses are so chosen that they will image the films 11 and 12 at a plane which is located at normal viewing distance from the eyes, in this case 15 inches. Hence, the convergence and accommodation are harmonized as the eyes are both accommodating and converging for a distance of 15 inches. The lenses 14, 15 will be comparatively weak, say about 2½ dioptres, and since they are placed close to the nodal points of the eyes, the angles subtended by the images formed by these lenses will be equal, within the limits of negligible amount, to those subtended by the films when viewed without lenses. The arrangement of Fig. 3, therefore, illustrates a correct method of viewing, according to my invention, stereograms which are small enough to be entirely separated by the offset introduced as hereinbefore explained.

As will often be the case, the films or stereograms will be of a comparatively large size, say 14 x 17 inches for example, so that the offset illustrated in Fig. 2 will not completely separate the films. Since it is essential that each eye sees its respective stereogram, recourse must be had to the reflecting type of stereoscope when viewing comparatively large size films or stereograms.

Figure 4:
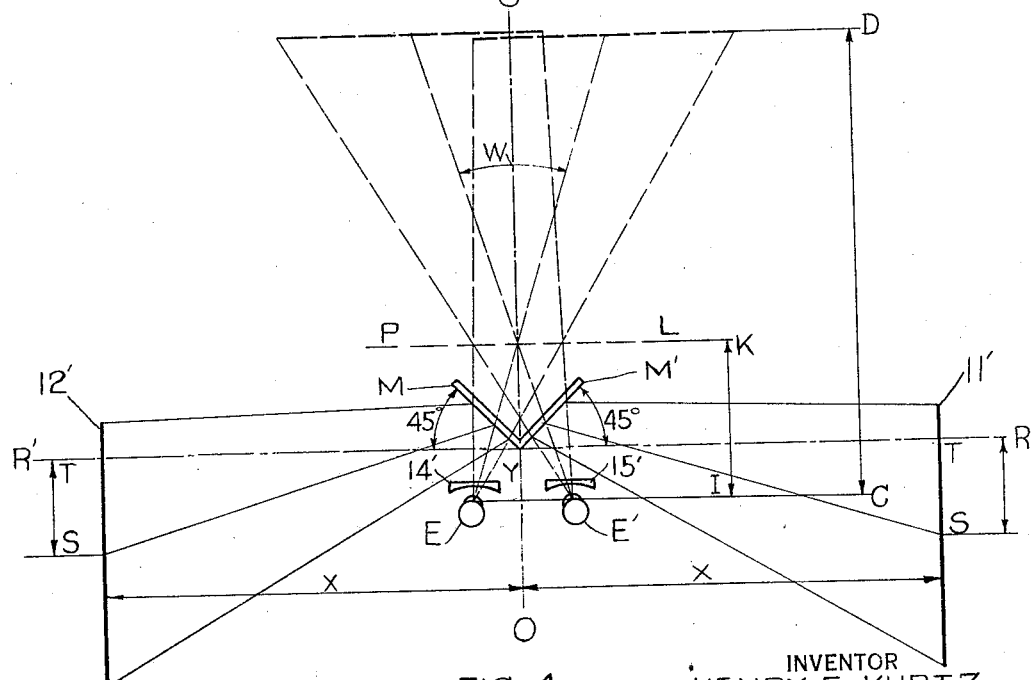
Fig. 4 is a diagrammatic view which shows a reflecting stereoscope adapted for viewing large stereograms and modified according to my present invention.

The use of a reflecting type of stereoscope for viewing large films, in accordance with my invention, is illustrated in Fig. 4 of the drawings. The relatively large X-ray films or stereograms are indicated at 11' and 12', film 11' being produced with the X-ray source in full line position of Fig. 1 and film 12' being produced with the source in dotted line position at the left in Fig. 1. As clearly illustrated, the films 11' and 12' are positioned laterally with respect to the viewing device. My improved viewing device comprises two angularly disposed reflectors M, M' which are adapted to reflect the images of the two films or stereograms 11', 12'. Cooperating with these mirrors are the negative lenses 14', 15' whereby the reflected images are imaged at a plane PL which is located at normal viewing distance in front of the eyes E, E' of the observer. The reflectors M, M' are positioned so that each lies at an angle of substantially 45 degrees to the axis OO', each reflector being perpendicular to the plane which is defined by the two positions of the X-ray source and the center of the film, as shown in Fig. 2, and so that this plane pierces the reflectors at mid-height.

The axis OO' is imaged normally to itself and extends to the right and left as shown at RR'. The films 11', 12' are so positioned that their centers are offset from the imaged axis RR' a distance ST. The amount of the offset ST is calculated in the same manner as the offset FG in Fig. 2, namely, by subtracting the interpupillary distance from the tube separation and dividing the remainder by two. The optical paths from the eyes to the mirrors and thence to the films are shown in full lines in Fig. 4, the positions of the images behind the mirrors being shown in dotted lines.

In order to obtain precise and comfortable stereoscopic views in accordance with my invention, it is essential that the optical path from the eye to the reflector and thence to the film should be equal to the exposure distance. As indicated on Fig. 4, the distance X plus the distance Y equals the exposure distance CD. Although I have shown two plane reflectors M and M', it is obvious that other reflecting means, such as prisms, may also be used. If prisms are used for reflectors, the glass path of the prisms must be reduced to air path in determining the distances at which the films are located.

With the arrangement illustrated in Fig. 4, precise and comfortable stereoscopic views may be obtained in accordance with my invention, as the eyes E, E' are both accommodating and converging for the image plane PL which is positioned at normal viewing distance in front of the eyes of the observer. The convergence angle, which is the angle formed by the intersecting visual axes of the two eyes, is indicated at W.

In order to obtain precise and comfortable stereoscopic views, it is essential that the various distances and locations, hereinbefore described, be strictly observed. In other words, a pair of films taken under the assumed specific conditions as to convergence and exposure distance, must be located in the stereoscope in only one position with respect to the optical axes of the stereoscope and of the exposure apparatus in order that they may be viewed under these specific convergence conditions. This precise location of films can be effected by using suitably arranged indicia means. Such means may take the form of a pair of points made of material which is opaque to X-rays and located on the film holder or cassette, whereby a trace of these marks will be made on the exposed films. A pair of properly arranged marks are arranged on the film holders of the viewing device so that the films will be properly located when the marks on the films are placed in register with the marks on the viewing device.

It is to be understood that the films or stereograms to be viewed are placed in front of the usual illuminated viewing boxes as are well known to one skilled in the art. My invention is not limited to the use of a normal viewing distance of 15 inches and an exposure distance of 45 inches, as these specific figures are by way of illustration only and it is obvious that my invention can be equally well applied to other viewing and exposing distances. It is also obvious that various modifications can be made without departing from the spirit of my invention and the specifications and accompanying drawings are to be interpreted as illustrative only and not in any limiting sense.

From the foregoing it will be apparent that I am able to attain the objects of my invention and provide methods and means for effecting Röntgenological reproduction which is characterized by precise, accurate stereoscopic views.

I claim:

1. A method of Röntgenological reproduction which comprises producing X-ray stereograms by successively exposing two sensitized elements to a source of X-rays located at a predetermined distance from said elements, shifting said source a certain distance between successive exposures, developing said exposed elements to produce X-ray stereograms, forming images of said stereograms at the exposure distance, forming images of said first named images at normal viewing distance from an observer's eyes and viewing said images under a convergence angle that is substantially the same as the angle subtended by the shift of said source at the predetermined exposure distance.

2. A method of producing X-ray stereograms which comprises establishing an exposure distance which is greater than normal viewing distance, successively exposing a pair of sensitized elements to a source of X-rays, shifting the source of X-rays between the successive exposures, and developing the exposed elements, the relation of the amount of shift of said source to the exposure distance being substantially the same as the relation of average interpupillary distance to normal viewing distance.

3. A method of producing X-ray stereograms which are to be viewed at a predetermined distance and angle of convergence, which comprises locating a sensitized element at a predetermined exposure distance which is greater than normal viewing distance from a source of X-rays, exposing said element to X-rays from said source, shifting said source a predetermined distance, replacing said element with a second sensitized element, exposing said second element, and developing both of said elements, the angle subtended by said distance of shift at said exposure distance being substantially the same as the angle subtended by average interpupillary distance at normal viewing distance.

4. The step in a method of producing a pair of X-ray stereograms which comprises establishing a predetermined exposure distance from the plane of an X-ray source to the plane of a sensitized element which is greater than normal viewing distance and a predetermined shift of said source, the ratio of said shift to said exposure distance being substantially the same as the ratio of average interpupillary distance to normal viewing distance.

5. A method of examining X-ray stereograms which have been produced by successively exposing sensitized elements to a source of X-rays located at a predetermined distance which is greater than normal viewing distance, and shifting said source a certain distance between successive exposures, which comprises forming images of said stereograms at normal viewing distance and viewing said images under a convergence angle which is substantially the same as the angle subtended by the distance of shift of said source at the exposure distance of said elements.

6. A method of stereoscopically recomposing a pair of X-ray stereograms which have been produced by successively exposing two sensitized elements to a source of X-rays at a predetermined distance which is greater than normal viewing distance and shifting the source a predetermined distance between successive exposures, which comprises positioning said stereograms at a distance from the eyes of the observer which is substantially the same as the exposure distance of said stereograms, each stereogram being offset a predetermined distance from the median plane passing between the eyes of the observer, forming images of said stereograms at substantially normal viewing distance, and viewing said images.

7. A method of stereoscopically recomposing a pair of X-ray stereograms, which have been produced by successively exposing two sensitized elements to a source of X-rays at a predetermined distance which is greater than normal viewing distance and shifting the source a predetermined distance between successive exposures, which comprises locating said stereograms at a distance from the observer's eyes which is substantially the same as the exposure distance of said stereograms, forming images of said stereograms at normal viewing distance and viewing one image with one eye and the other image with the other eye.

8. A method of producing X-ray stereograms which comprises establishing an exposure distance which is greater than normal viewing distance, successively exposing a pair of sensitized elements to a source of X-rays, shifting the source of X-rays between the successive exposures, and developing the exposed elements, the relation of the amount of shift of said source to the exposure distance being substantially the same as the relation of the average interpupillary distance to normal viewing distance.

HENRY F. KURTZ.